(12) United States Patent
Littman et al.

(10) Patent No.: US 11,320,814 B2
(45) Date of Patent: May 3, 2022

(54) PROACTIVE COMPRESSOR FAILURE REMEDIATION

(71) Applicant: Beckman Coulter, Inc., Brea, CA (US)

(72) Inventors: Brian J. Littman, Prior Lake, MN (US); Xiao Yin, Eden Prairie, MN (US)

(73) Assignee: Beckman Coulter, Inc., Brea, CA (US)

( * ) Notice: Subject to any disclaimer, the term of this patent is extended or adjusted under 35 U.S.C. 154(b) by 274 days.

(21) Appl. No.: 16/787,754

(22) Filed: Feb. 11, 2020

(65) Prior Publication Data

US 2021/0373548 A1 Dec. 2, 2021

Related U.S. Application Data (60) Provisional application No. 62/803,963, filed on Feb. 11, 2019.

(51) Int. Cl.
*G05B 23/02* (2006.01)
*F25B 49/02* (2006.01)
*G06F 11/07* (2006.01)

(52) U.S. Cl.
CPC ........ *G05B 23/0283* (2013.01); *F25B 49/022* (2013.01); *G06F 11/0706* (2013.01); *F25B 2700/193* (2013.01)

(58) Field of Classification Search
CPC .............. G05B 23/0283; F25B 49/022; F25B 2700/193; G06F 11/0706
See application file for complete search history.

(56) References Cited

U.S. PATENT DOCUMENTS

| 8,761,911 B1* | 6/2014 | Chapman | H04L 67/10 |
| | | | 700/83 |
| 2003/0115890 A1* | 6/2003 | Jayanth | F04B 51/00 |
| | | | 62/126 |
| 2020/0033224 A1* | 1/2020 | Walters | G01M 3/26 |

FOREIGN PATENT DOCUMENTS

WO WO-2020139949 A1 * 7/2020 ............... H04Q 9/00

* cited by examiner

*Primary Examiner* — Manuel L Barbee (57) ABSTRACT

A diagnostic instrument failure prediction and remediation system may include a compressed air system and a computer configured to analyze stored information regarding the compressed air system to predict likely failures of the compressed air system. Such analysis may utilize information such as duty cycle information for a compressor comprised by the compressed air system and pressure information for a pressure sensor for a compressed air system.

21 Claims, 4 Drawing Sheets

PROACTIVE COMPRESSOR FAILURE REMEDIATION

RELATED APPLICATIONS

This application is related to, and claims the benefit as a non-provisional of, provisional application No. 62/803,963 titled Proactive Compressor Failure Remediation filed at the USPTO on Feb. 11, 2019. The contents of that application are hereby incorporated by references in their entirety.

FIELD

The disclosed technology pertains identifying incipient failures in the compressed air system of a diagnostic instrument and proactively addressing those failures based on their underlying causes.

BACKGROUND

Diagnostic instrumentation may use compressed air for a variety of purposes, such as operating valves or cylinders to grip reagents, open and close doors, and/or eject and feed vessels. However, due to variations in wear patterns between instruments (e.g., on account of differing conditions in laboratories where such diagnostic instruments may be located), wear on compressors is generally not part of the predictive maintenance performed for diagnostic instruments. Instead, various components of a compressed air system are generally repaired as they fail, which can result in lengthy downtime (e.g., 2-3 days, depending on the nature of the failure) due to part ordering and transportation delays associated with deploying field service engineers. This downtime can pose significant problems, as the instrument may be unusable for testing purposes until the failure has been remediated.

SUMMARY

Embodiments of the present disclosure may be used to identify incipient failures in the compressed air system of a diagnostic instrument and proactively address those failures based on the underlying causes.

One embodiment may be to provide a diagnostic instrument failure prediction and remediation system. Such a system may comprise an accumulator in fluid communication with a compressor and a pressure sensor. In such a system the accumulator, compressor and pressure sensor may all be comprised by a compressed air system for a diagnostic instrument. Such a system may also comprise a database adapted to store duty cycle information for the compressor and pressure information for the pressure sensor. Such a system may also comprise a computer configured to store the duty cycle information for the compressor and the pressure information for the pressure sensor in the database. Such a computer may also be configured to periodically analyze the stored duty cycle information for the compressor and the pressure information for the compressor sensor. Such a computer may also be configured to, based on the analysis and a determination of a likely failure of the compressed air system, perform one or more analysis tasks using the information stored in the database for the pressure sensor and the compressor. Such a computer may also be configured to, based on an output of the one or more analysis tasks, determine one or more remediation actions to perform. Other embodiments are also disclosed.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Predicting and proactively addressing likely compressed air system failures can be difficult due to varying conditions of the locations (e.g., laboratories) where instruments containing such systems are located. However, waiting for component failure and only remediating after the fact can result in significant downtime. Aspects of the disclosed technology may be deployed to address these issues.

One embodiment may provide a diagnostic instrument failure prediction and remediation system. Such a system may comprise an accumulator in fluid communication with a compressor and a pressure sensor. In such a system the accumulator, compressor and pressure sensor may all be comprised by a compressed air system for a diagnostic instrument. Such a system may also comprise a database adapted to store duty cycle information for the compressor and pressure information for the pressure sensor. Such a system may also comprise a computer configured to store the duty cycle information for the compressor and the pressure information for the pressure sensor in the database. Such a computer may also be configured to periodically analyze the stored duty cycle information for the compressor and the pressure information for the compressor sensor. Such a computer may also be configured to, based on the analysis and a determination of a likely failure of the compressed air system, perform one or more analysis tasks using the information stored in the database for the pressure sensor and the compressor. Such a computer may also be configured to, based on an output of the one or more analysis tasks, determine one or more remediation actions to perform. In one embodiment a predictive analytics model may be used to analyze the stored duty cycle data. In an example embodiment, regression models such as time series regression or linear regression or logistic regression or multinomial regression or spline models and their variants may be used. In another example embodiment, predictive modelling/analysis may be use models to analyze a relationship between the specific performance of a unit in a sample and one or more known attributes or features of the unit. It will be immediately apparent to one skilled in the art that various other techniques known the art may also be employed to perform predictive analytics.

In a further embodiment, the one of more analysis tasks may comprise determining a time period during which the likely failure of the compressed air system can be expected to take place.

In a further embodiment, the one or more analysis tasks may comprise determining an underlying cause of the likely failure of the compressed air system.

In a further embodiment, the one or more additional analysis tasks may comprise identifying a time period during which the likely failure of the compressed air system can be expected to take place, and a set of compressed air system parts to use in remediating the likely failure of the compressed air system. In such an embodiment, the one or more remediation actions may comprise dispatching a field service engineer to a location of the compressed air system with each compressed air system part in the set of compressed air system parts prior to the time period during which the likely failure of the compressed air system can be expected to take place.

In a further embodiment, the determination of the likely failure of the compressed air system is based on detection of one or more patterns from a set of data patterns stored in a non-transitory computer readable medium. In such an embodiment, the set of data patterns may comprise: duty cycle information for the compressor indicates the compressor on time during an analysis period is greater than a first threshold value; pressure information for the pressure sensor indicates an average pressure during the analysis period less than a second threshold value; pressure information for the pressure sensor indicates a standard deviation of pressure readings during the analysis period is greater than a third threshold value; pressure information for the pressure sensor indicates an average change in pressure measurements during the analysis period is greater than a fourth threshold value; and pressure information for the pressure sensor indicates a standard deviation of changes in pressure in pressure measurements during the analysis period is greater than a fifth threshold value.

In a further embodiment, the determination of the likely failure of the compressed air system is based on detecting one or more patterns from the set of data patterns stored in the non-transitory computer readable medium based on data from a first analysis period. In some such embodiments, the determination of the likely failure of the compressed air system may be based on detecting at least two patterns from a set of data patterns during a second analysis period. In some such embodiments, the first analysis period may be a preceding 24 hour period, and the second analysis period may be a preceding 72 hour period. In some such embodiments, the first analysis period may be a preceding 12 hour period, and the second analysis period may be a preceding 36 hour period. In some cases the at least two patterns may be at least two different patterns. In some cases the at least two patterns may be the same pattern detected at least two times during the second analysis period.

In a further embodiment, the computer may be located remotely from, and may be communicatively connected with, a plurality of diagnostic instruments that comprises the diagnostic instrument and that comprises at least one additional diagnostic instrument located remotely from the diagnostic instrument. Corresponding methods and computer readable media may also be implemented as embodiments of aspects of the disclosed technology.

Figure 1:
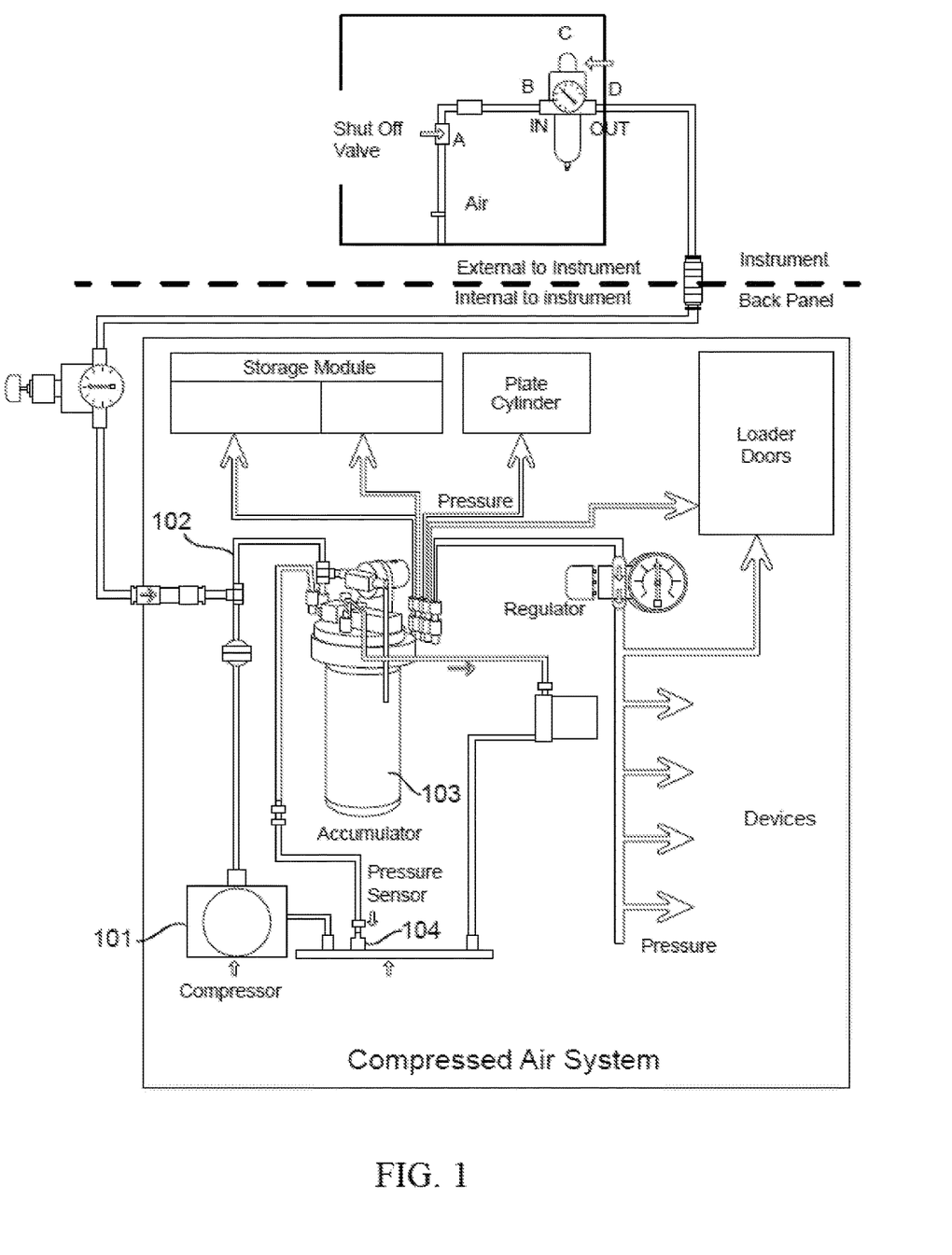
FIG. 1 shows an exemplary compressed air system for a diagnostic instrument.

Turning now to the figures, FIG. 1 shows an exemplary compressed air system for a diagnostic instrument which may be used in some embodiments. A compressed air system may include a compressor 101, such as a piston pump that could pressurize air at atmospheric pressure into air at higher pressure. In some embodiments, such a compressor 101 may be connected by tubing 102 to an accumulator 103, which may be used to store air which has been compressed by the compressor 101. The accumulator 103 may also be connected to a pressure sensor 104 that would read pressure in the accumulator 103.

In some embodiments, operation of the compressor 101 in a compressed air system such as shown in FIG. 1 may be controlled by the sensor 104 connected to the accumulator 103. For example, in some embodiments, a voltage signal from the pressure sensor 104 may be converted to a pressure value. Then, if the air pressure in the accumulator 103 has dropped below a minimum pressure level, the compressor 101 may be powered on and operate until a target pressure level had been reached. As air from the accumulator 103 is consumed in actuation of the various components of the instrument, the pressure will gradually drop until is falls below the minimum pressure level, at which point the compressor could again be powered on. This cycle may be repeated continuously during instrument operation.

It should be understood that, while FIG. 1 illustrates a compressed air system that may be used in some embodiments, that compressed air system is intended to be illustrative only, and that various embodiments may be deployed in contexts with compressed air systems that differ from the particular configuration and components illustrated in FIG. 1. For example, in some embodiments, aspects of the disclosed technology may be used to predict faults in a compressed air system that includes multiple compressors. Similarly, in some embodiments, pressure sensors may be disposed at different locations in the system (e.g., between a pressure sensor and an accumulator) either in addition to or as an alternative to the pressure sensor 104 illustrated in FIG. 1. Accordingly, the compressed air system of FIG. 1, along with the discussion of that system set forth herein, should not be treated as implying limitations on the types of compressed air systems that could be used with the disclosed technology, or on the protection provided by this document or any related document.

Figure 2:
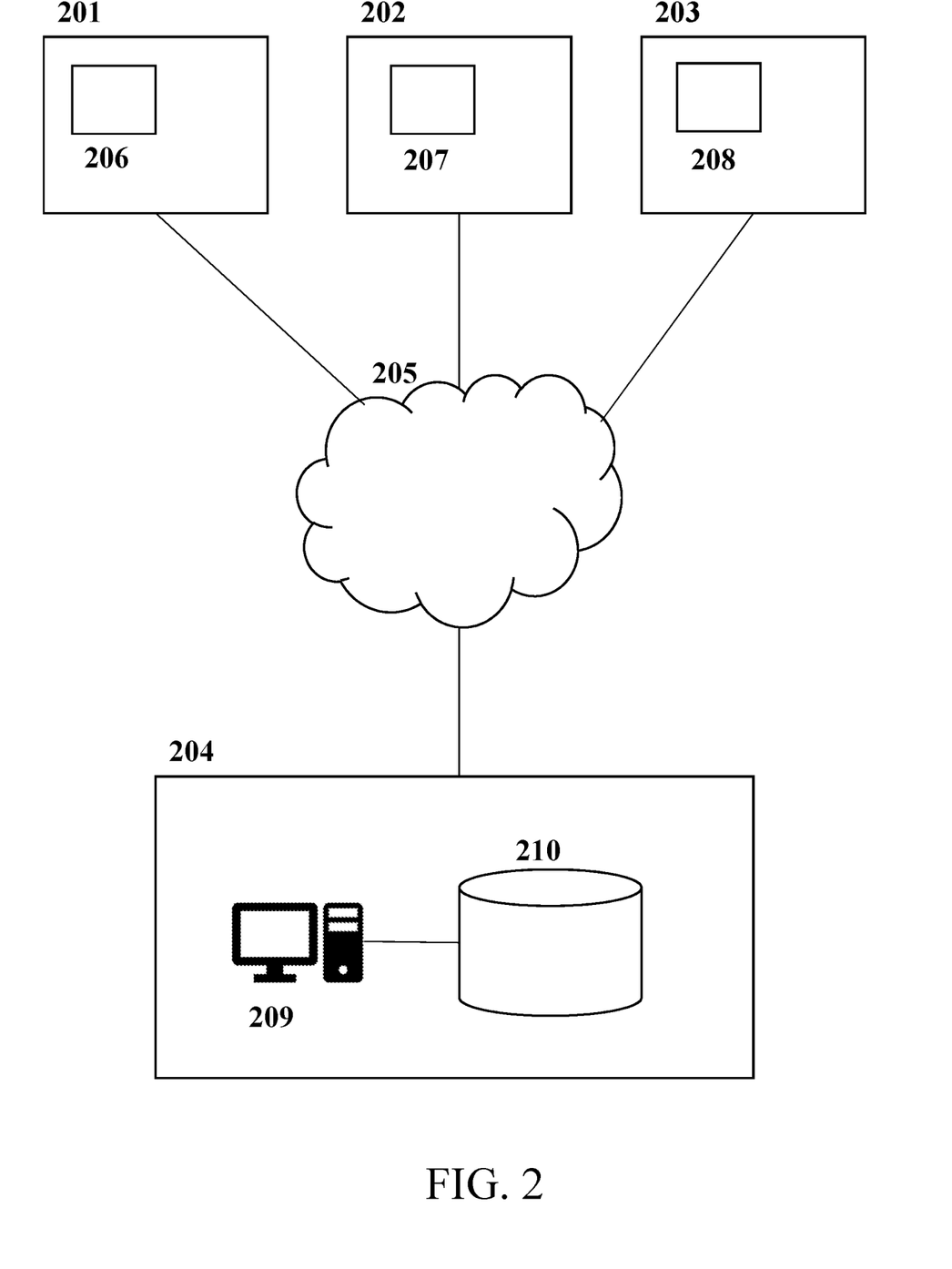
FIG. 2 shows an exemplary environment in which compressed air system failure prediction technology such as disclosed herein may be deployed.

Turning now to FIG. 2, that figure shows an exemplary environment in which compressed air system failure prediction technology such as disclosed herein may be deployed. In that environment, a plurality of laboratories 201 202 203 are connected to a remote maintenance system 204 via a network 205. Within each of the laboratories 201 202 203, there is disposed a diagnostic instrument 206 207 208 comprising a compressed air system such as illustrated in FIG. 1. Within the remote maintenance system 204, there is an analysis server 209 and a database 210. In operation, the diagnostic instruments 206 207 208 would send information relating to the operation of their compressed air systems to the remote maintenance system 204 where it would be stored in the database 210 and processed using a processor from the analysis server 209. For example, in some embodiments, the diagnostic instruments may be configured to periodically (e.g., every ten minutes) capture pressure measurements, and to capture duty cycle information indicating whenever the compressor 104 was turned on or off. This information may then be sent to the remote maintenance system 204 where it may be stored in the database 210, and may be periodically (e.g., every 12 hours, every 24 hours, etc.) queried by the analysis server 209 for analysis using a failure prediction model. Then, if the failure prediction model indicated that a compressed air system from one of the diagnostic instruments 206 207 208 was at a significant risk of failure, a field service engineer could be deployed to the appropriate laboratory to proactively address the underlying cause of the failure, thereby avoiding the instrument downtime associated with remedying the issue only after the failure actually occurs.

Figure 3:
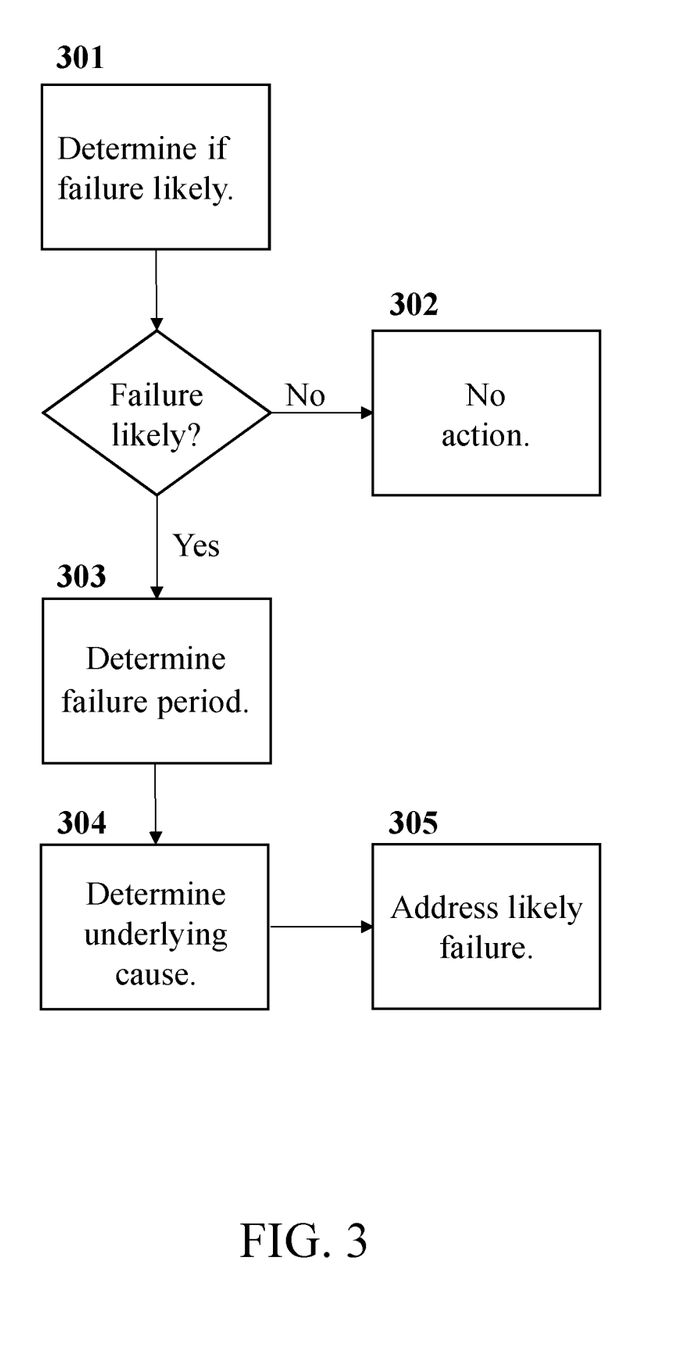
FIG. 3 illustrates an exemplary process that may be used in some embodiments to proactively address likely compressed air system failures.

Turning now to FIG. 3, that figure illustrates an exemplary process that may be used in some embodiments to proactively address likely compressed air system failures by a remote maintenance system 204 such as shown in FIG. 2. In the process of FIG. 3, initially a determination 301 may be made of if a failure was likely in a particular compressed air system. In some embodiments, this may be done by reviewing information stored in the database 210 for a particular compressed air system and comparing that information with a set of conditions that, if satisfied, would be treated as indicating that the compressed air system was likely to fail. For example, in some embodiments, a compressed air system could be treated as likely to fail if one or more of the types of patterns set forth below in table 1 are detected in the data collected for that system.

TABLE 1

Exemplary patterns that may be treated as indicating a likely compressed air system failure.

1) duty cycle is greater than a threshold value (e.g., greater than X % on in the preceding A hour period).
2) average pressure is less than a threshold value (e.g., less than Y PSI in the preceding A hour period).
3) standard deviation of pressure readings is greater than a threshold value (e.g., standard deviation of readings gathered in the preceding A hours is greater than Z PSI).
4) average change in pressure measurements is greater than a threshold value (e.g., average change in pressure between measurements in the preceding A hours is greater than W PSI, average of pressure measurements in the preceding A hours is more than W PSI greater than the average of pressure measurements taken in the A hours before that).
5) standard deviation of changes in pressure measurements is greater than a threshold value (e.g., standard deviation of changes in pressure between measurements in preceding A hours is greater than Q PSI, standard deviation of pressure measurements in the preceding A hours is more than Q PSI greater than the standard deviation of pressure measurements taken in the A hours before that).

In the above table, A, X, Y, Z, W and Q are parameter values that would be used to determine if a particular pattern is or is not present. As is discussed in more detail with respect to FIG. 4, the specific values of A, X, Y, Z, W and Q may vary (e.g., values of X, Y, Z, W and Q may be different according to specific cases to balance the cost of falsely predicting failure versus failing to predict a failure before it occurs; values of A may be different according to specific cases depending on the data available and the types of patterns reflected in that data) depending on the context of a particular embodiment.

In the process of FIG. 3, if the initial determination 301 indicates that a failure was not likely, the remote maintenance system 204 could conclude it was most appropriate to take no remedial action 302 with respect to that compressed air system. Alternatively, if the initial determination 301 indicated that a failure was likely, additional analysis may be performed to develop information that could be used to more appropriately address the likely failure. This additional analysis may include, for example, determining 303 a time period during which the likely failure could be expected to occur. In some embodiments, this might be done by applying a statistical model that projected, based on the data that led to the initial determination 301 of a likely failure, a time period during which the failure could be expected to take place with some level of confidence (e.g., 95%).

In some embodiments, additional analysis that may be performed in the event that the initial determination 301 indicated a likely failure may also (or alternatively) include determining 304 an underlying cause for the likely failure. This could be done by, for example, using a set of rules that would tie failures of particular aspects of the compressed air system to particular relationships in the data that would have indicated a likely failure in the initial determination 301. For example, some embodiments may use rules such as shown below in table 2 to determine 304 an underlying cause of a likely failure of a compressed air system.

TABLE 2

Exemplary rules for determining underlying causes of likely compressed air system failures.

IF average duty cycle is high (e.g., greater than X %) AND standard deviation of pressure readings is low (e.g., less than Z PSI) THEN identify the underlying cause of the likely failure as leakage.
IF average duty cycle is high AND standard deviation of pressure readings is high (e.g., greater than Z PSI) THEN identify the underlying cause of the likely failure as a compressor malfunction.
IF average duty cycle is low (e.g., less than X %) AND average pressure is high (e.g., greater than Y PSI) THEN identifying the underlying cause of the likely failure as a compressor malfunction.

Finally, in the process of FIG. 3, after it had been determined 301 that a compressed air system was likely to fail, a time period had been determined 303 for when the likely failure could be expected to take place, and an underlying cause for the likely failure had been identified 304, one or more actions could be taken to address 305 the likely failure. For example, if it appeared that the likely cause of the failure was a compressor 101 malfunction, and that the likely failure could be expected to take place within 12-14 days, an order for a replacement compressor could automatically be placed, and an appointment for a field service engineer to visit the location of the impacted compressed air system to install the replacement compressor within 12 days could be scheduled. Alternatively, it if appeared that the underlying cause of the likely failure was a loose tube or valve, then a field service engineer could be dispatched on a more expedited basis (e.g., within 1-2 days) to simply tighten the loose component, since there would be no need to order or wait for any replacement parts. Other types of actions to address a likely failure are also possible, and will depend on the cause of the likely failure and the time period during which it could be expected to take place. Accordingly, the discussion above of actions that could be taken to address a likely failure should be understood as illustrative only, and should not be treated as limiting.

It should be understood that variations on actions that could be taken to address a likely compressed air system failure are not the only types of variations that some embodiments may implement for proactively address likely compressed air system failures. For example, in some embodiments, rather than treating detection of a pattern such as shown in table 1 as indicating a likely compressed air system failure, a remote maintenance system 204 could be configured only treat a compressed air system as likely to fail if multiple patterns were detected within temporal proximity of each other (e.g., a compressed air system would be treated as likely to fail if two different patterns were detected within three days of each other, or if a single pattern was detected multiple times within a set period, such as a 36 hour period or a 72 hour period). As another example, in some embodiments, rather than using the same data in the initial determination of likely failure as well as the additional analysis of expected failure time and/or underlying cause, different types of data may be used in the different types of analysis. For instance, in some embodiments, average or length of duty cycle periods, or standard deviation of duty cycle measurements between periods may not be considered as part of the initial determination of whether a failure was likely, but may be considered as part of the additional analysis of a likely failure's expected time and/or underlying cause (or vice versa). Additional variations could also be made depending on the available data and other resources (e.g., replacement parts) in a particular context, and so the above description of variations, like the discussion of FIG. 3 that preceded it, should be understood as being illustrative only, and should not be treated as limiting.

Figure 4:
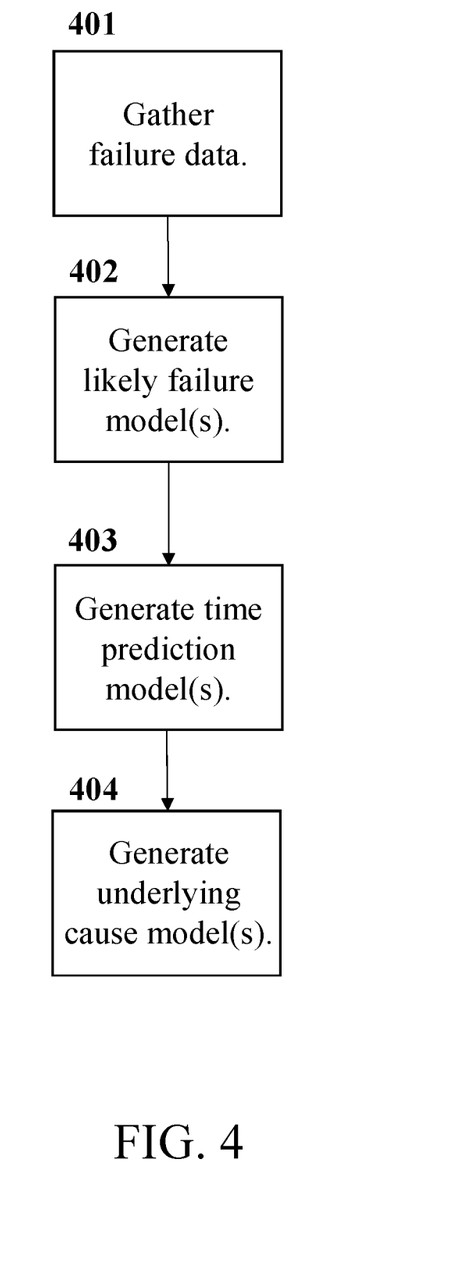
FIG. 4 illustrates an exemplary process that may be used in some embodiments to construct compressed air system failure prediction models.

Turning now to FIG. 4, that figure illustrates a process that may be used in some embodiments to construct compressed air system failure prediction models. Initially, in the process of FIG. 4, data is gathered 401 on past failures of compressed air systems. This may be done, for example, by transferring information stored in local databases at the locations of various instruments to a central database for analysis, by running compressed air systems in diagnostic instruments under normal conditions and gathering data on their operation until such time as they fail, and/or by retrieving data from a central location such as a remote maintenance system 204 database 210 (if available). Once this data is available, it can be used to generate 402 models that would predict if a compressed air system was likely to fail. This may be done, for example, by performing an initial analysis of the failure data to determine hypotheses about patterns that were likely to occur in machines that failed within a reasonable period of time (e.g., within two months of the observation of the pattern), and then using Bayes' formula to evaluate and refine those patterns until a set of patterns with a desired confidence (e.g., 90% confidence) had been obtained. This refinement process may produce a variety of models, and may in some cases produce different results depending on relative costs of false positive and false negative predictions. For example, if the disclosed technology is used by an entity that has determined it would be cost justified to deploy field service engineers to remediate failures if at least 80% of the deployments were necessary, that entity would likely have looser parameters (i.e., would treat a pattern as detected based on values less far from the norm) than an entity that had determined it would be cost justified to deploy field service engineers to remediate failures only if at least 90% of the deployments were necessary.

After one or more failure model(s) had been generated 402, a process such as shown in FIG. 4 may continue with generating 403 models that would predict a timeframe for when a likely failure could be expected to occur. This may be done, for example, by using the parameters identified as indicating likely failure during the initial model generation 402 to define a search space, and then using the previously gathered 401 failure data (with bootstrap resampling as necessary depending on the amount of data available) to generate statistical models indicating time periods when the failure could be expected to occur with a sufficiently high degree of confidence (e.g., 95%). A similar approach to could be used to generate 404 model(s) for predicting the underlying cause of a likely failure. That is, where the previously gathered 401 data indicated causes of failures, this data could be mined to determine correlations between observed causes and failure indicators. Similarly, in cases where the previously gathered 401 data did not indicate causes of failures, other data could be utilized to provide similar information. For example, in some cases, notes of field service engineers who has fixed the failures represented in the previously gathered 401 data could be consulted to identify causes of failure and to supplement the information used to generate the models used to determine likelihood and timing of potential compressed air system failures.

A process such as shown in FIG. 4 and/or one or more of its steps, may also be used in some embodiments to update failure prediction models after they are initially generated. For example, in some embodiments, as information is added to a remote maintenance system 240 database 210, this information may be used to refine the prediction of likely failure, such as through further periodic application of Bayes' formula. Similar refinements (e.g., refining models for predicting a period for when a likely failure could be expected to take place) may also be made for other models generated using a process such as shown in FIG. 4. Accordingly, the reference to updating models using application of Bayes' formula with additional data should be understood as being illustrative only, and should not be treated as limiting.

While the above description has set forth various embodiments and examples of how compressor failure prediction technology could be implemented, it should be understood that hose examples and embodiments are intended to be illustrative only, and should not be treated as limiting. For example, while some embodiments may use pressure data captured by a sensor used to control operation of a compressor for making compressor failure predictions, other embodiments may utilize one or more other sensors for gathering such failure prediction data, or may even include only sensors for predicting compressor failures and may not use a sensor for controlling compressor operation as described in the context of FIG. 1. Similarly, while some embodiments may utilize data sent to a remote maintenance system 204 to make predictions about compressed air systems at various laboratories 201 202 203, in some embodiments data regarding compressed air system operation may be gathered at the laboratories themselves, and computers located at those laboratories (potentially even computers incorporated into the instruments themselves) may be used to make predictions regarding the failures of their local compressed air systems. In such cases, in the event a likely failure was detected, it may be addressed by providing an alert or some other type of warning message at the laboratory so that the instrument's users could be aware of the failure and take appropriate actions themselves to address it (which actions may include contacting the instrument's manufacturer to schedule a service call).

In light of the potential variations on the disclosed embodiments that will be immediately apparent to, and could be implemented without undue experimentation by, those of ordinary skill in the art in light of this disclosure, the protection provided by this document or any related document should not be limited to the embodiments explicitly set forth herein. Instead, such protection should be understood as being defined by the claims in such document when the terms in those claims which are listed below under the heading "Explicit Definitions" are given the definitions set forth under that heading and the remaining terms are giving their broadest reasonable interpretation as set forth in a general purpose dictionary.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "determining" should be understood to refer generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "lab instrument" or "instrument" should be understood to refer to any tool, machine, equipment, device, or combination of one or more thereof, whether fully or partially located within a laboratory (e.g., one portion of the lab instrument may be within a laboratory while another portion may be hosted in the cloud), or fully or partially located elsewhere, that may be used or may be configured to be used as recited in the claims.

When used in the claims a "means for predicting failure in the compressed air system based on duty cycle information for the compressor and pressure information for the pressure sensor" should be understood as a means plus function limitation as provided for in 35 U.S.C. § 112(f), in which the function is "predicting failure in the compressed air system based on duty cycle information for the compressor and pressure information for the pressure sensor" and the corresponding structure is a computer configured to perform processes as illustrated in FIG. 3 and described in the corresponding text.

When used in the claims, a "set" should be understood as referring to a group of zero or more elements of similar nature, design or function.

The invention claimed is:

1. A diagnostic instrument failure prediction and remediation system comprising a computer coupled to the diagnostic instrument and configured to:
   a) receive duty cycle information from a compressor and pressure information from a pressure sensor of a compressed air system of the diagnostic instrument;
   b) store the duty cycle information and pressure information in a database, the database coupled to the computer;
   c) perform one or more analysis tasks using the information periodically to determine a likely failure of the compressed air system; and
   d) based on an output of the one or more analysis tasks, determine one or more remediation actions to be performed on the compressed air system of the diagnostic instrument.

2. The system of claim 1, wherein the one or more analysis tasks comprises determining a time period during which the likely failure of the compressed air system can be expected to take place.

3. The system of claim 1, wherein the one or more analysis tasks comprises determining an underlying cause of the likely failure of the compressed air system.

4. The system of claim 1, wherein:
   a) the one or more analysis tasks comprises identifying:
      i) a time period during which the likely failure of the compressed air system can be expected to take place; and
      ii) a set of compressed air system parts to use in remediating the likely failure of the compressed air system;
   and
   b) the one or more remediation actions comprises dispatching a field service engineer to a location of the compressed air system with each compressed air system part in the set of compressed air system parts prior to the time period during which the likely failure of the compressed air system can be expected to take place.

5. The system of claim 1, wherein determining the likely failure of the compressed air system is based on detection of one or more patterns from a set of data patterns stored in a non-transitory computer readable medium.

6. The system of claim 5, wherein the set of data patterns comprises:
   a) duty cycle information indicates the compressor on time during an analysis period is greater than a first threshold value;
   b) pressure information indicates an average pressure during the analysis period less than a second threshold value;
   c) pressure information indicates a standard deviation of pressure readings during the analysis period is greater than a third threshold value;
   d) pressure information indicates an average change in pressure measurements during the analysis period is greater than a fourth threshold value; and
   e) pressure information indicates a standard deviation of changes in pressure measurements during the analysis period is greater than a fifth threshold value.

7. The system of claim 5, wherein:
   a) determining the likely failure of the compressed air system is based on detecting one or more patterns from the set of data patterns stored in the non-transitory computer readable medium based on data from a first analysis period; and
   b) determining the likely failure of the compressed air system is based on detecting at least two patterns from the set of data patterns during a second analysis period.

8. The system of claim 7, wherein:
   a) the first analysis period is a preceding 24 hour period; and
   b) the second analysis period is a preceding 72 hour period.

9. The system of claim 1, wherein the computer is located remotely from, and is communicatively connected with, a plurality of diagnostic instruments that comprises the diagnostic instrument and that comprises at least one additional diagnostic instrument located remotely from the diagnostic instrument.

10. The system of claim 1, wherein performing the one or more analysis tasks comprises:
    a) determining the compressed air system can be expected to experience the likely failure; and
    b) based on determining the compressed air system can be expected to experience the likely failure, performing one or more additional analysis tasks, wherein the one or more additional analysis tasks comprise:
       i) determining a time period during which the likely failure of the compressed air system can be expected to take place; and
       ii) determining an underlying cause of the likely failure of the compressed air system.

11. A diagnostic instrument failure prediction and remediation method performed by a computer coupled to the diagnostic instrument, the method comprising:
    a) receiving duty cycle information from a compressor and pressure information from a pressure sensor of a compressed air system of the diagnostic instrument;
    b) storing the duty cycle information and pressure information in a database, the database coupled to the computer;

c) periodically performing one or more analysis tasks using the information to determine a likely failure of the compressed air system; and d) based on an output of the one or more analysis tasks, determining one or more remediation actions to be performed on the compressed air system of the diagnostic instrument.

12. The method of claim 11, wherein the one or more analysis tasks comprises determining a time period during which the likely failure of the compressed air system can be expected to take place.

13. The method of claim 11, wherein the one or more analysis tasks comprises determining an underlying cause of the likely failure of the compressed air system.

14. The method of claim 11, wherein:
a) the one or more analysis tasks comprises identifying:
   i) a time period during which the likely failure of the compressed air system can be expected to take place; and
   ii) a set of compressed air system parts to use in remediating the likely failure of the compressed air system;
and
b) the one or more remediation actions comprises dispatching a field service engineer to a location of the compressed air system with each compressed air system part in the set of compressed air system parts prior to the time period during which the likely failure of the compressed air system can be expected to take place.

15. The method of claim 11, wherein determining the likely failure of the compressed air system is based on detection of one or more patterns from a set of data patterns stored in a non-transitory computer readable medium.

16. The method of claim 15, wherein the set of data patterns comprises:
a) duty cycle information indicates the compressor on time during an analysis period is greater than a first threshold value;
b) pressure information indicates an average pressure during the analysis period less than a second threshold value;
c) pressure information indicates a standard deviation of pressure readings during the analysis period is greater than a third threshold value;
d) pressure information indicates an average change in pressure measurements during the analysis period is greater than a fourth threshold value; and e) pressure information indicates a standard deviation of changes in pressure measurements during the analysis period is greater than a fifth threshold value.

17. The method of claim 15, wherein:
a) determining the likely failure of the compressed air system is based on detecting one or more patterns from the set of data patterns stored in the non-transitory computer readable medium based on data from a first analysis period; and
b) determining the likely failure of the compressed air system is based on detecting at least two patterns from the set of data patterns during a second analysis period.

18. The method of claim 17, wherein:
a) the first analysis period is a preceding 24 hour period; and
b) the second analysis period is a preceding 72 hour period.

19. The method of claim 11, wherein the computer is located remotely from, and is communicatively connected with, a plurality of diagnostic instruments that comprises the diagnostic instrument and that comprises at least one additional diagnostic instrument located remotely from the diagnostic instrument.

20. The method of claim 11, wherein performing the one or more analysis tasks comprises:
a) determining the compressed air system can be expected to experience the likely failure; and
b) based on determining the compressed air system can be expected to experience the likely failure, performing one or more additional analysis tasks, wherein the one or more additional analysis tasks comprise:
   i) determining a time period during which the likely failure of the compressed air system can be expected to take place; and
   ii) determining an underlying cause of the likely failure of the compressed air system.

21. A machine comprising:
a) a diagnostic instrument comprising a compressed air system comprising an accumulator, a pressure sensor and a compressor, wherein the pressure sensor and the compressor are in fluid communication with the accumulator; and
b) a means for predicting failure in the compressed air system based on duty cycle information for the compressor and pressure information for the pressure sensor.

* * * * *